(12) United States Patent
Shimizu

(10) Patent No.: US 6,859,855 B1
(45) Date of Patent: Feb. 22, 2005

(54) DATA PROCESSING DEVICE

(75) Inventor: Tomoyasu Shimizu, Sagamihara (JP)

(73) Assignee: Murata Manufacturing Co., Ltd., Kyoto (JP)

(*) Notice: Subject to any disclaimer, the term of this patent is extended or adjusted under 35 U.S.C. 154(b) by 557 days.

(21) Appl. No.: 09/642,433

(22) Filed: Aug. 21, 2000

(30) Foreign Application Priority Data

Aug. 19, 1999 (JP) .......................................... 11-232555

(51) Int. Cl.⁷ .............................................. G06F 9/44
(52) U.S. Cl. ....................... 711/103; 711/202; 711/221; 717/168
(58) Field of Search .......................... 711/1–2, 101–103, 711/202, 213, 221; 712/37, 226, 227; 713/1–2, 100; 714/6–8; 717/168, 173–174, 178; 365/185, 33, 94

(56) References Cited

U.S. PATENT DOCUMENTS 5,625,791 A * 4/1997 Farrugia et al. ............ 711/106

FOREIGN PATENT DOCUMENTS

| GB | 2295908 A | * | 6/1996 | ............. G06F/9/44 |
|---|---|---|---|---|
| JP | 63-311436 | | 12/1988 | |
| JP | 03-172031 | | 7/1991 | |
| JP | 08-195952 | | 7/1996 | |

* cited by examiner

Primary Examiner—Denise Tran
(74) Attorney, Agent, or Firm—Keating & Bennett, LLP

(57) ABSTRACT

A data processing device includes a read-only memory, a flash memory capable of modifying information stored therein and adding information thereto, a central processing unit performing data processing using information stored in the read-only memory and the flash memory, an information storage area provided in the flash memory for storing predetermined modifiable information among the information used by the central processing unit for data processing, an address storage area provided in the flash memory for storing at least the address of information stored in the information storage area, and an address-modification control unit for, after at least one of modification of modifiable information stored in the information storage area and addition of modifiable information to the information storage area is performed, performing modification of the address of the information stored in the address storage area.

2 Claims, 3 Drawing Sheets

DATA PROCESSING DEVICE

BACKGROUND OF THE INVENTION

1. Field of the Invention

The present invention relates to a data processing device such as a communication device for performing data processing using a central processing unit (CPU).

2. Description of the Related Art

FIG. 3 shows the construction of a PHS (Personal Handyphone System) 1, which is one example of a data processing device. Other examples of data processing devices include portable telephones, copy machines, facsimile machines, and the like.

The PHS 1 includes a radio frequency unit (RFU) 2, a baseband IC (BBIC) 3, a CPU 4, a flash memory 5, a DTE I/F (Data Terminal Equipment Interface) 6, and an antenna 7. The CPU 4 has a ROM (Read Only Memory) 8 incorporated therein. The mask-programmable type of ROM is widely used.

The ROM 8 includes at least a main program for the data processing procedure of the CPU 4 and other information such as information on functions (subroutine programs) used in the program, information on storage addresses of the functions or storage addresses of variables used in the program, and information on interrupt vectors for containing the addresses of interrupt routines of the CPU 4. The flash memory 5 also includes information for the data processing procedure. The flash memory is generally slower than ROM, but has the advantage of being rewritable.

When the antenna 7 receives a signal, the PHS 1 causes the RFU 2 and the BBIC 3 to extract predetermined information (data) from the received signal and output it to the CPU 4. The CPU 4 performs data processing based on the extracted information, information stored in the ROM 8, and information stored in the flash memory 5.

When the PHS 1 transmits information, the CPU 4 outputs the desired information to the BBIC 3. The BBIC 3 and the RFU 2 cause the information to modulate a transmission signal and then to be transmitted from the antenna 7.

The ROM 8 is a storage device in which high-speed data access can be performed. Accordingly, in order to achieve high-speed data processing, the main program for the CPU 4 and information on functions, storage addresses, and the like used in the program are provided in the ROM 8.

However, since the ROM 8 is a read-only storage device, information stored therein cannot be modified. Therefore, the data processing cannot be upgraded in the conventional PHS having the main program and the like stored in ROM, because the main program and the like cannot be modified.

SUMMARY OF THE INVENTION

Accordingly, it is an object of the present invention to provide a data processing device in which the main program and information on functions and the like can be freely modified, thus enabling data processing to be upgraded.

To this end, according to a first aspect of the present invention, there is provided a data processing device including a ROM, a flash memory capable of modifying information stored therein and adding information thereto, a CPU performing data processing using information stored in the ROM and the flash memory, an information storage area provided in the flash memory for storing predetermined modifiable information among the information used by the CPU for data processing, an address storage area provided in the flash memory for storing at least the address of the information stored in the information storage area and an address-modification control unit for, after at least one of modification of modifiable information stored in the information storage area and addition of modifiable information to the information storage area, and in accordance with said modification of the information or addition of the information, modifying of the address of the information stored in the address storage area or addition of the address of the information to the address storage area, whereby the information used by the CPU for data processing can be freely modified or added.

With the first aspect of the invention, a main program can be stored in ROM while functions and variables to be referenced by the main program can be stored in the flash (rewritable) memory. By providing the address storage area in the flash memory and providing the address-modification control unit, the address of information can be modified or added in accordance with modification of the information in the information storage area or addition of the information thereto. Therefore, the CPU can correctly read the modified information or the added information, whereby desired modified data processing can be performed.

According to a second aspect of the present invention, a data processing device includes a ROM, a flash memory capable of modifying information stored therein and adding information thereto, the CPU performing data processing using information stored in the ROM and the flash memory, an information storage area provided in the ROM for storing information used by the CPU for data processing, an address storage area provided in the flash memory for storing at least the address of predetermined modifiable information among the information stored in the information storage area, a modified-information storage area provided in the flash memory for storing modified modifiable information, and an address-modification control unit for, after the modified modifiable information is stored in the modified-information storage area of the flash memory, and in accordance with the modification of the information, modifying the address of the information stored in the address storage area, whereby the information of the CPU used for data processing can be freely modified or added.

With the second aspect of the invention, a modified function can be stored in the flash memory, and the CPU can be controlled to use the modified function for data processing. By providing the information storage area and the modified-information storage area in the flash memory in which information stored therein can be modified and information can be added thereto, functions and the like which are stored in the information storage area can be modified or functions and the like can be added to the information storage area.

According to a third aspect of the present invention, a data processing device includes a ROM, a flash memory capable of modifying information stored therein and adding information thereto, a CPU performing data processing using information stored in the ROM and the flash memory, an information storage area provided in the ROM for storing information used by the CPU for data processing, a modified-information storage area provided in the flash memory for storing modified predetermined modifiable information among the information stored in the information storage area, and an information-modification determining unit for determining whether modified information is stored in the modified-information storage area, wherein, when the information-modification determining unit determines that the modified information is stored in the modified-information storage area of the flash memory, the CPU is arranged to perform data processing in accordance with the modified information stored in the flash memory instead of information stored in the ROM.

Generally speaking a CPU operates as follows: (1) detecting a power-on signal; (2) checking hardware; (3) accessing the initial address of a main program; (4) fetching and decoding an instruction set; etc. The third aspect of the invention can provide a mechanism for determining whether a main program has been modified, which can be executed after step (2) mentioned above. Alternatively, the determination can be made at a predetermined stage during the execution of the main program.

With the third aspect of the invention, a modified main program can be stored in the flash memory, and the CPU can be controlled to use the modified main program instead of the original main program in the ROM. By providing the modified-information storage area in the flash memory and providing an information-modification determining unit for determining whether modified information is stored in the modified-information storage area, when the information-modification determining unit determines that modified information is stored in the modified-information storage area, the CPU is arranged to perform data processing in accordance with the modified information. In addition to modification of information used for data processing, this arrangement enables the data processing device to perform data processing based on the modified information.

As described above, since the data processing device according to the present invention enables information used for data processing (including a main program, functions, or variables) to be modified or added, and since desired modified data processing can be correctly performed using modified or added information, a data processing device in which data processing is upgradeable can be provided.

According to further aspects of the invention, methods are provided for carrying out the functions of the above-described data processing devices.

Other features and advantages of the present invention will become apparent from the following description of the invention which refers to the accompanying drawings.

DESCRIPTION OF EMBODIMENTS OF THE INVENTION

Figure 1:
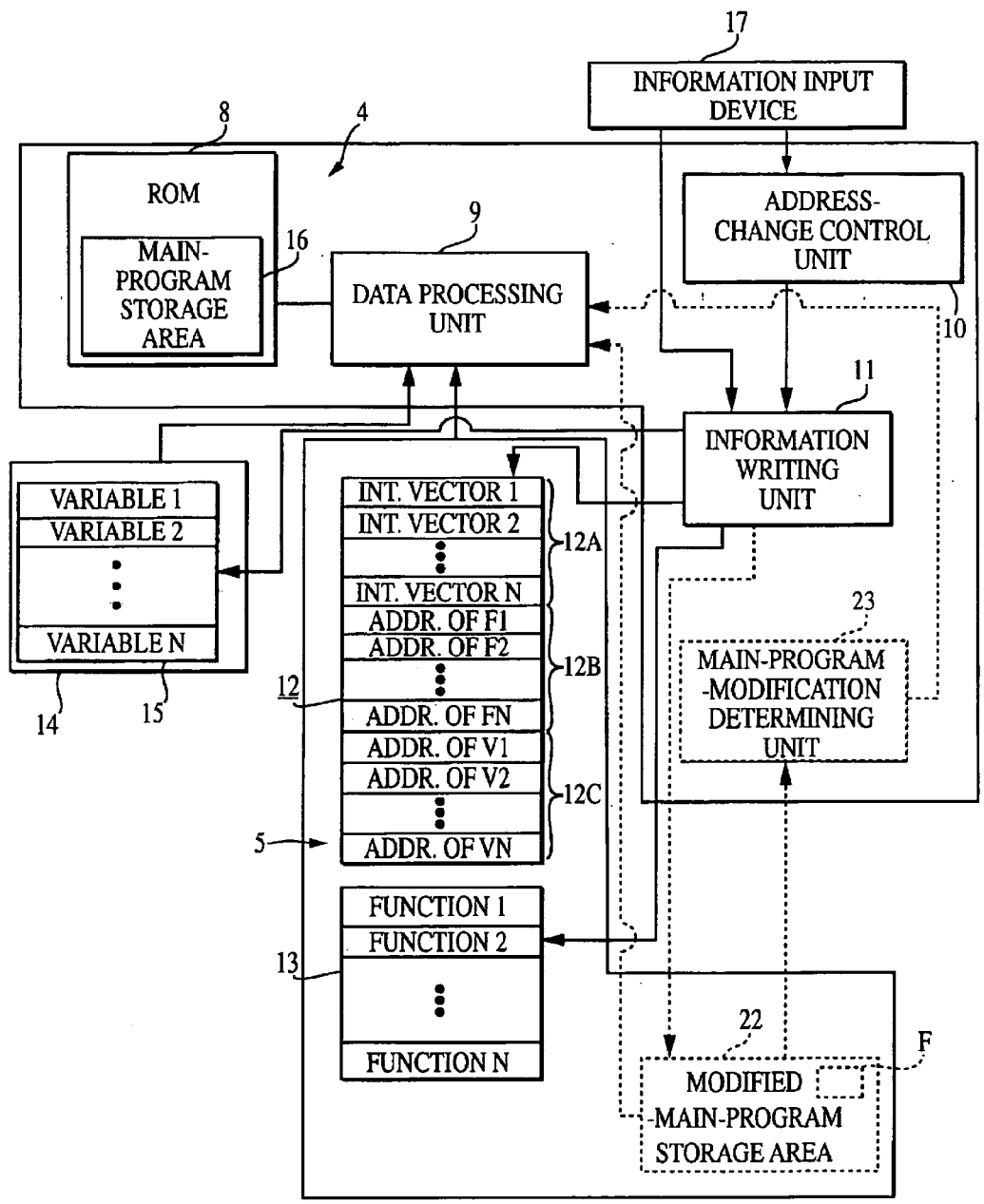
FIG. 1 is a block diagram showing characteristic main components of first and third embodiments of the present invention.

In FIG. 1, characteristic main components of a PHS, which is one example of a data processing device according to a first embodiment of the present invention, are shown using solid lines. In description of the first embodiment, components that are identical to corresponding components in FIG. 3 have the same reference numerals, and a repeated description thereof is omitted.

Figure 3:
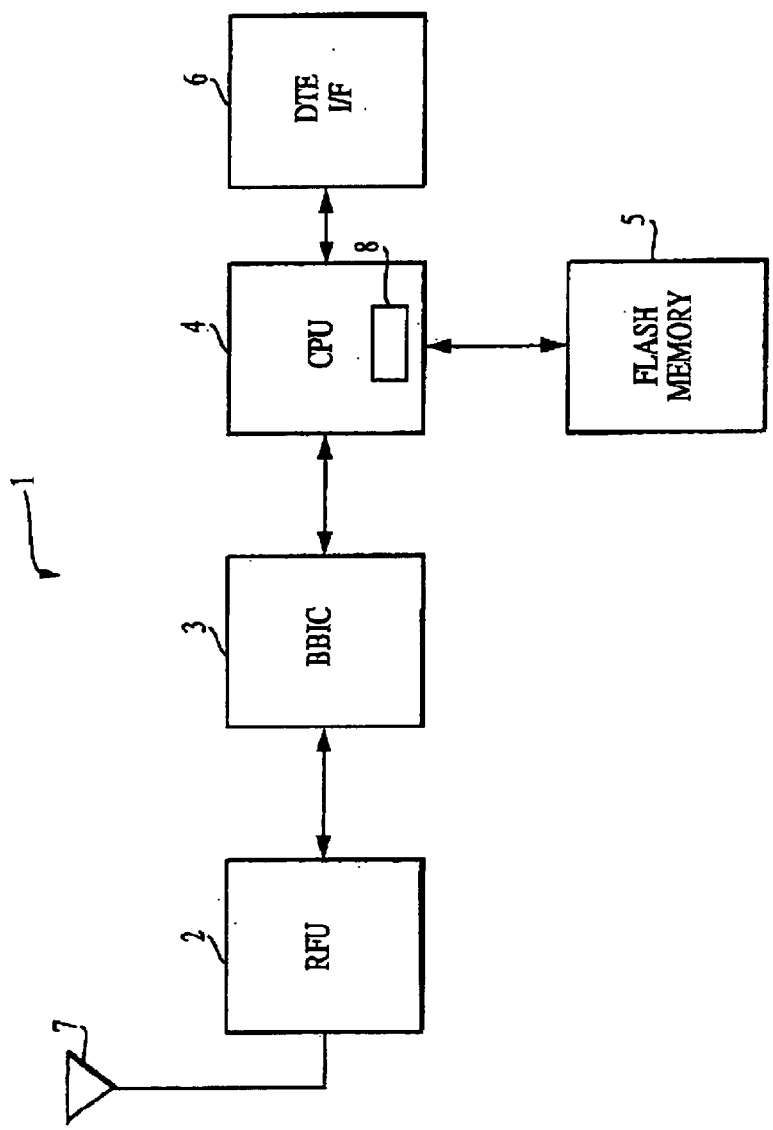
FIG. 3 is a block diagram illustrating an example of a data processing device.

The PHS is provided with the construction shown in FIG. 3. Furthermore, the PHS has a construction so that functions used for the data processing can be modified, the modified functions (not the functions before modification thereof) can be correctly read, and data processing can be performed using the modified functions. In accordance with the above-described modification of the functions, the storage addresses of variables and interrupt vectors used in the data processing may be changed. Accordingly, the PHS has a construction to deal with such changes of the storage addresses of the variables and changes of the interrupt vectors.

The CPU 4 includes a ROM 8, a data processing unit 9, an address-change control unit 10, and an information-writing unit 11. The flash memory 5 includes an address storage area 12 and a function storage area 13 (information storage area). The PHS is further provided with a RAM (Random Access Memory) 14. The RAM 14 is provided with a variable-storage area 15 for storing at least one variable therein. The ROM 8 is provided with a main-program storage area 16 for storing the main program for performing data processing.

The address storage area 12 includes an interrupt vector table area 12a for storing at least one interrupt vector therein, a function address table area 12b for storing at least one function storage address therein, and a variable address table area 12c for storing at least one variable storage address therein. The function storage area 13 stores information for at least one function therein.

The data processing unit 9 performs data processing in accordance with the main program stored in the main-program storage area 16 of the ROM 8. When data processing is performed, functions or variables are read from the function storage area 13 or the variable-storage area 15 by referring to the function addresses or the variable addresses stored in the address storage area 12 of the flash memory 5. In addition, interrupt processing is performed by referring to an interrupt vector stored in the address storage area 12.

When it is detected that additional information for a function is being input using an information input device 17 such as a keyboard, the information-writing unit 11 stores the additional information for the function is an unused region of the function storage area 13.

When a function stored in the function storage area 13 is desired to be modified and when information for the modified function is input using the information input device 17, the information-writing unit 11 detects the input of the information for the modified function and then stores the information for the modified function in the function storage area 13 using either of the following two methods. According to a first method, the information-writing unit 11 overwrites the original function (the function to be modified) with the modified function; and according to a second method, the information-writing unit 11 stores the modified function in a location (an unused region) whose address is different from that of the original function).

When the additional information for the function is stored in the function storage area 13, when the modified function is stored at a different location from the original function, or when the storage addresses of the variables used for the function are changed in accordance with modification or addition of the function, it is necessary to appropriately modify address information in the address storage area 12 or add address information to the address storage area 12, so that the modified function, the added function, or a desired variable can be correctly read.

In the first embodiment, the address-change control unit 10 is provided to avoid the foregoing problem. For example, when detecting that address information for related functions or related variables which are modified or added in accordance with modification or addition of the function is input using the information input device 17, the address-change control unit 10 determines whether the input address information is for modification of only the added or modified part of the address storage area 12, or for modification of the entirety thereof.

When it determines that the input address information is for modification of only the modified part, the address-change control unit 10 causes the information-writing unit 11 to overwrite a modification address (the information address to be modified) stored in the address storage area 12 with the input address information. Alternatively, the information-writing unit 11 stores the input address information in an unused region of the address storage area 12.

When it determines that the input address information is for modification of the entirety of the address storage area 12, the address-change control unit 10 causes the information-writing unit 11 to modify the contents of the entirety of the address storage area 12 with the input address information.

When information for modification or addition of an interrupt vector is input using the information input device 17 to modify or add the interrupt vector, the address-change control unit 10 determines whether the input address information is for modification of only the added or modified part of the address storage area 12 or for modification of the entirety thereof. Based on the determination, the address-change control unit 10 causes the information-writing unit 11 to add the interrupt vector to the address storage area 12, modify the modification interrupt vector in the address storage area 12 with the input interrupt vector, or modify all information in the address storage area 12 with the input address information.

In the first embodiment, since the function storage area 13 is provided in the flash memory 5 in which information can be freely added or modified, the functions stored in the function storage area 13 can be added or modified.

Since the address storage area 12 is provided in the flash memory 5 and the address-change control unit 10 is provided in the CPU 4, modification or addition of the addresses of related functions used for the function, or modification or addition of the addresses of related variables used for the function can be performed in accordance with the modification or addition of the function. This construction can avoid the foregoing problem in which, although modification or addition of the function is performed, the modified or added function cannot be correctly read, so that data processing cannot be correctly performed.

Since the interrupt vector table area 12a is provided in the address storage area 12 of the flash memory 5, an interrupt vector can be modified or added when necessary.

As described above, since the first embodiment is provided with the construction in which the functions used in the data processing can be freely added or modified, the addresses of the related functions or the addresses of the related variables can be freely added or modified in accordance with modification or addition of the function, and the interrupt vector also can be freely modified or added, the data processing device can perform a desired modified data processing. In other words, a data processing device can be provided in which data processing thereof is upgradeable.

A second embodiment of the present invention is described. In the description of the second embodiment, components that are identical to corresponding components in the first embodiment have the same reference numerals, and a repeated description thereof is omitted.

Figure 2:
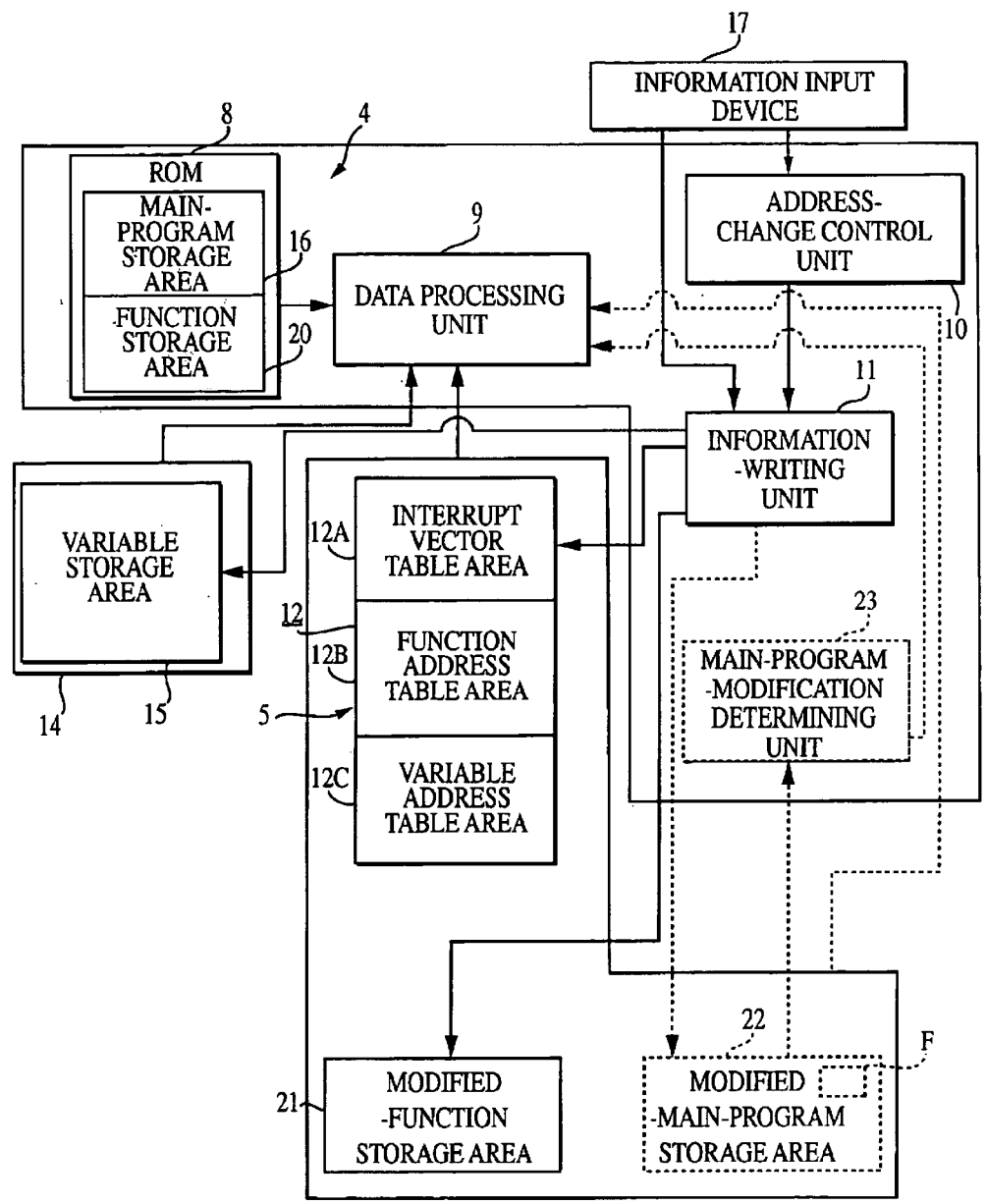
FIG. 2 is a block diagram showing characteristic main components of a second embodiment and the third embodiment of the present invention.

Characteristic features of the second embodiment, which distinguish it from the first embodiment, are represented by solid lines in FIG. 2. That is, a function storage area 20 (information storage area) for storing functions is provided in the ROM 8 and, instead of the function storage area 13, a modified-function storage area 21 (modified-information storage area) is provided in the flash memory 5. Otherwise, the construction of the second embodiment is substantially identical to that of the first embodiment.

When it detects that information for a modified or an added function is being input using the information input device 17, the information-writing unit 11 stores the modified or the added function in the modified-function storage area 21. When the modified function is stored in the modified-function storage area 21, the input modified function may be overwritten on the modification function stored in the modified-function storage area 21, or the input modified function may be stored in a location whose address is different from that of the modification function.

As described above, when the function is modified or added and then when addresses stored in the address storage area 12 are not changed after modification or addition of the function, a problem such as a failure in reading the modified or added information arises. Accordingly, in order to positively avoid this problem, the address-change control unit 10 modifies or adds the corresponding addresses stored in the address storage area 12 in the same manner as in the first embodiment.

In the second embodiment, the function storage area 20 is provided in the ROM 8 (read only) and the modified-function storage area 21 is formed in the flash memory 5 (re-writable). By storing the information for the modified or added function in the modified-function storage area 21, the modified or added function can be held in the data processing device. Furthermore, since the address-change control unit 10 is provided, it can modify or add the address of a function stored in the address storage area 12 in accordance with modification or addition of the function, so that the modified or added function can be correctly read from the modified-function storage area 21.

Furthermore, the functions which are not to be modified are arranged to be read from the function storage area 20 of the ROM 8. Since data stored in the ROM 8 can be read faster than data stored in the flash memory 5, compared to a case in which all functions are read from the flash memory 5, high-speed data processing can be performed by reading the unmodified functions from the ROM 8.

A third embodiment of the present invention is described. In the description of the third embodiment, components that are identical to corresponding components in the foregoing embodiments have the same reference numerals, and a repeated description thereof is omitted.

Characteristic features of the third embodiment are represented using dashed lines in FIGS. 1 and 2. That is, a modified-main-program storage area (modified-information storage area) 22 is formed in the flash memory 5 and a main-program-modification determining unit 23 is provided in the CPU 4. Otherwise, the construction of the third embodiment is substantially identical to those of the foregoing embodiments.

In the third embodiment, when the main program stored in the main-program storage area 16 of the ROM 8 is desired to be changed, a modified main program is input by the information input device 17. After detection of the input of the modified main program, the information-writing unit 11 stores the modified main program in the modified-mainprogram storage area 22. At this time, a flag F representing storage of the modified main program is set in the modified-main-program storage area 22.

In accordance with a main-program-modification determining instruction output from the data processing unit 9, the main-program-modification determining unit 23 determines, based on the flag F, whether the modified main program is stored in the modified-main-program storage area 22.

In the third embodiment, the data processing unit 9 outputs the main-program-modification determining instruction at a predetermined timing which is preset by the main program in the ROM 8. For example, in order to provide for modification of the entirety of the main program in the ROM 8, the main program stored in the ROM 8 is programmed so that the main-program-modification determining instruction is output at the beginning of the main program.

In this case, the data processing unit 9 outputs the main-program-modification determining instruction in accordance with the main program in the ROM 8 and the main-program-modification determining unit 23 determines in accordance with the instruction whether the main program has been modified. When the data processing unit 9 detects, based on the determination, that there is a modified main program stored in the modified-main-program storage area 22, data processing is performed in accordance with the modified main program stored in the modified-main-program storage area 22 instead of the main program stored in the ROM 8.

In order to provide for partial modification of the main program in the ROM 8, the main program stored in the ROM 8 is programmed so that the main-program-modification determining instruction is output at the beginning of at least one modifiable program part at a predetermined location in the main program.

In this case, before executing the at least one modifiable program part, the data processing unit 9 causes the main-program-modification determining unit 23 to determine whether the main program has been modified. When the data processing unit 9 detects, based on the determination, that there is a modified program which is a modification of the modifiable program part in the ROM 8 stored in the modified-main-program storage area 22, data processing is performed in accordance with the modified program stored in the modified-main-program storage area 22 instead of the main program stored in the ROM 8. After processing is performed in accordance with the modified program, the data processing unit 9 returns to processing in accordance with the main program stored in the ROM 8.

In this third embodiment, since, in addition to the same construction as in the foregoing embodiments, the modified-main-program storage area 22 is provided, the main program can be modified, not to mention that the function and the address information can be modified or added in the same manner as in the foregoing embodiments. Since the main-program-modification determining unit 23 is provided, when the modified main program is input, data processing can be performed, based on the determination of the main-program-modification determining unit 23, in accordance with the modified main program instead of the main program stored in the ROM 8. The problem of data processing being performed in accordance with the main program stored in the ROM 8 even after the modified main program is input can be avoided.

The present invention is not limited to the foregoing embodiments. Other embodiments of the invention may take various forms. For example, although the ROM 8 is provided in the CPU 4, it may be provided outside the CPU 4. In each embodiment, the interrupt vector table area 12a, the function address table area 12b, and the variable address table area 12c are provided in the address storage area 12. However, when change of the interrupt vector is not needed, the interrupt vector table 12a does not need to be provided. In addition, when modification and addition of variable addresses are not needed, the variable address table area 12c does not need to be provided.

In the first and second embodiments, although only a function is described as being modifiable information, information other than the function may be modified. In this case, an area for the other information may be provided in the address storage area 12.

In the second embodiment, when a function stored in the function storage area 20 in the ROM 8 is modified and the modified function is stored in the modified-function storage area 21 of the flash memory 5, the modified function is arranged to be correctly read by replacing the original address (which may be stored in the ROM 8) of the modification function, with a new address of the modified function. The modified function may be arranged to be correctly read by providing the following construction.

For example, a modified-function address table area, for storing the addresses of the functions stored in the modified-function storage area 21, is provided in the address storage area 12, and a modified-function determining unit (modified-information determining unit) is provided for determining whether there is a modified function stored in the modified-function storage area by referring to the modified-function address table area. The main program stored in the ROM 8 is programmed so that a modified-function determining instruction is output before the function is read.

Therefore, while data processing is performed in accordance with the main program stored in the ROM 8 before the function is read, the data processing unit 9 causes the modified-function determining unit to determine whether there is a modified function stored in the modified-function storage area 21. When the data processing unit 9 detects, based on the determination, that the modified function is stored in the modified-function storage area 21, data processing is performed using the modified function instead of the function stored in the function storage area 20 of the ROM 8. Thus, this alternative construction enables the modified function to be correctly read.

In the foregoing embodiments, an example in which the PHS is the data processing device is described. However, the present invention is not limited to the PHS and can be applied to any device provided with a function performing data processing. For example, the present invention can be applied to a communication device such as a portable telephone other than the PHS, a data processing device other than a communication device, and the like.

Although the present invention has been described in relation to particular embodiments thereof, many other variations and modifications and other uses will become apparent to those skilled in the art. Therefore, the present invention is not limited by the specific disclosure herein.

What is claimed is:
1. A data processing device comprising:
a read-only memory;
a flash memory capable of modifying information stored therein and adding information thereto;
a central processing unit performing data processing using information stored in said read-only memory and said flash memory;

an information storage area provided in said flash memory for storing predetermined modifiable information among the information used by said central processing unit for data processing;

an address storage area provided in said flash memory for storing at least the address of the information stored in said information storage area; and an address-modification control unit for, after at least one of modification of modifiable information stored in said information storage area and addition of modifiable information to said information storage area, and in accordance with said one of the modification of the information and addition of the information, performing one of modification of the address of the information stored in said address storage area and addition of the address of the information to said address storage area; wherein the information used by said central processing unit for data processing can be freely modified or added; and the address-modification control unit controls a function address table area including at least one address of a subroutine program used in a main program executable by the central processing unit for performing data processing and a variable address table area including at least one address of a variable used in the main program.

2. A method in a data processing device comprising:

a read-only memory;

a flash memory capable of modifying information stored therein and adding information thereto;

a central processing unit performing data processing using information stored in said read-only memory and said flash memory;

an information storage area in said flash memory; and an address storage area in said flash memory;

said method comprising the steps of:

storing in said information storage area predetermined modifiable information among the information used by said central processing unit for data processing;

storing in said address storage area at least the address of the information stored in said information storage area;

performing at least one of modification of modifiable information stored in said information storage area and addition of modifiable information to said information storage area; and then, in accordance with said one of modification of the information and addition of the information, performing one of modification of the address of the information, stored in said address storage area and addition of the address of the information to said address storage area; wherein the information used by said central processing unit for data processing can be freely modified or added; and the address storage area includes a function address table area including at least one address of a subroutine program used in a main program executable by the central processing unit for performing data processing and a variable address table area including at least one address of a variable used in the main program.

* * * * *